United States Patent
Gillespie et al.

(10) Patent No.: US 10,375,513 B2
(45) Date of Patent: Aug. 6, 2019

(54) EVENT NOTIFICATION SYSTEMS AND METHODS

(71) Applicant: 3 Electric Sheep Pty Ltd, Cannon Hill, Queensland (AU)

(72) Inventors: David Andrew Gillespie, Cannon Hill (AU); Phillip Joseph Frantz, Woodend (AU); Frank Stranges, Berwick (AU)

( * ) Notice: Subject to any disclaimer, the term of this patent is extended or adjusted under 35 U.S.C. 154(b) by 0 days.

(21) Appl. No.: 14/889,856

(22) PCT Filed: May 1, 2014

(86) PCT No.: PCT/AU2014/050025
§ 371 (c)(1),
(2) Date: Nov. 8, 2015

(87) PCT Pub. No.: WO2014/176646
PCT Pub. Date: Nov. 6, 2014

(65) Prior Publication Data
US 2016/0150370 A1    May 26, 2016

(30) Foreign Application Priority Data

May 1, 2013  (AU) ................................ 2013901518

(51) Int. Cl.
*H04W 4/02*    (2018.01)
*H04W 4/021*   (2018.01)
(Continued)

(52) U.S. Cl.
CPC ........ *H04W 4/021* (2013.01); *G06Q 30/0261* (2013.01); *H04L 51/20* (2013.01);
(Continued)

(58) Field of Classification Search
CPC ....... H04W 4/021; H04W 4/025; H04W 4/18; H04W 4/028; H04W 4/04; H04W 12/06;
(Continued)

(56) References Cited

U.S. PATENT DOCUMENTS 7,541,940 B2 * 6/2009 Upton ...................... G08B 1/08
340/686.1
7,696,868 B1 * 4/2010 Emigh ................. G06Q 10/109
340/539.13
(Continued)

FOREIGN PATENT DOCUMENTS

WO    WO2010/075233 A1    7/2010
WO    WO2014/038912       3/2014
WO    WO2014/085657       6/2014

*Primary Examiner* — Nathan A Mitchell
(74) *Attorney, Agent, or Firm* — Nwamu, P.C.

(57) ABSTRACT

Disclosed herein is an event notification system (10). The system (10) comprises a receiver (14) arranged to receive event information comprising geographical region information indicative of a geographical region for each of a plurality of events and time interval information indicative of a time interval for each of the plurality of events, the receiver (14) also being arranged to receive location information indicative of a location of a wireless communication device (12) at a time. The system comprises a notifier (16) arranged to use the event information and the location information when so received to determine a set comprising each of the plurality of events for which the geographical region encompasses the location of the mobile wireless communication device (12) and the time interval encompasses the time, and arranged to send event notification information indicative of at least one event in the set to the mobile communications device (12) for the mobile communications device (12) to notify a user of the at least one event in the set.

9 Claims, 8 Drawing Sheets

(51) Int. Cl.
  *H04W 4/029* (2018.01)
  *H04W 4/12* (2009.01)
  *H04L 29/08* (2006.01)
  *H04W 4/04* (2009.01)
  *H04W 4/18* (2009.01)
  *H04L 12/58* (2006.01)
  *G06Q 30/02* (2012.01)
  *H04W 4/21* (2018.01)

(52) U.S. Cl.
  CPC .............. *H04L 67/18* (2013.01); *H04L 67/26* (2013.01); *H04W 4/025* (2013.01); *H04W 4/029* (2018.02); *H04W 4/04* (2013.01); *H04W 4/12* (2013.01); *H04W 4/18* (2013.01); *H04W 4/21* (2018.02)

(58) Field of Classification Search
  CPC ........ H04W 4/12; H04W 4/206; H04L 67/18; H04L 51/20; H04L 63/08; H04L 67/26; G06Q 30/0261
  See application file for complete search history.

(56) References Cited

U.S. PATENT DOCUMENTS

| | | | | |
|---|---|---|---|---|
| 8,054,180 B1* | 11/2011 | Scofield | .................. | G06Q 30/06 340/539.11 |
| 8,090,780 B2* | 1/2012 | Hjelmeland Almas | ...................... | G06Q 10/107 455/404.2 |
| 8,391,827 B2* | 3/2013 | McKenna | ............... | G08B 21/10 340/539.22 |
| 8,676,626 B1* | 3/2014 | Vance | .................. | G06Q 10/109 705/7.16 |
| 8,698,622 B1* | 4/2014 | Emigh | ................. | G06Q 10/109 340/539.13 |
| 9,307,033 B1* | 4/2016 | Meschkat | ............... | H04L 67/18 |
| 2002/0068583 A1* | 6/2002 | Murray | ................. | H04M 3/432 455/456.3 |
| 2003/0224762 A1* | 12/2003 | Lau | ..................... | G06Q 10/109 455/412.2 |
| 2004/0207522 A1* | 10/2004 | McGee | ................. | G06Q 10/109 340/539.13 |
| 2006/0293065 A1* | 12/2006 | Chew | .................... | G06Q 30/02 455/456.3 |
| 2008/0032666 A1* | 2/2008 | Hughes | ................... | H04W 4/02 455/404.1 |
| 2008/0032703 A1* | 2/2008 | Krumm | ................... | H04W 4/02 455/456.1 |
| 2008/0137602 A1* | 6/2008 | Khivesara | ........... | H04L 12/1881 370/329 |
| 2009/0093259 A1* | 4/2009 | Edge | ..................... | H04H 60/51 455/456.3 |
| 2009/0258636 A1* | 10/2009 | Helvick | .............. | H04L 12/5895 455/414.2 |
| 2010/0113066 A1* | 5/2010 | Dingler | ................... | H04W 4/02 455/456.3 |
| 2011/0274258 A1* | 11/2011 | Casalaina | ............ | H04L 12/589 379/93.01 |
| 2012/0108259 A1 | 5/2012 | Weiss | | |
| 2013/0150091 A1* | 6/2013 | Ingram | .................... | G08G 1/20 455/456.3 |
| 2014/0057656 A1* | 2/2014 | Hasegawa | ................. | G01S 5/02 455/456.2 |
| 2015/0005010 A1* | 1/2015 | Zhang | ................... | H04W 4/023 455/456.3 |
| 2015/0172393 A1* | 6/2015 | Oplinger | ................. | H04L 67/18 709/204 |
| 2015/0280930 A1* | 10/2015 | Zamer | ................. | H04L 12/1845 455/41.1 |
| 2015/0312713 A1* | 10/2015 | Basir | ................ | G06Q 10/109 455/456.3 |
| 2016/0014564 A1* | 1/2016 | Del Vecchio | ............ | G08G 1/20 455/456.2 |
| 2016/0066145 A1* | 3/2016 | Pietraniec | ............ | H04W 4/021 455/456.3 |

* cited by examiner

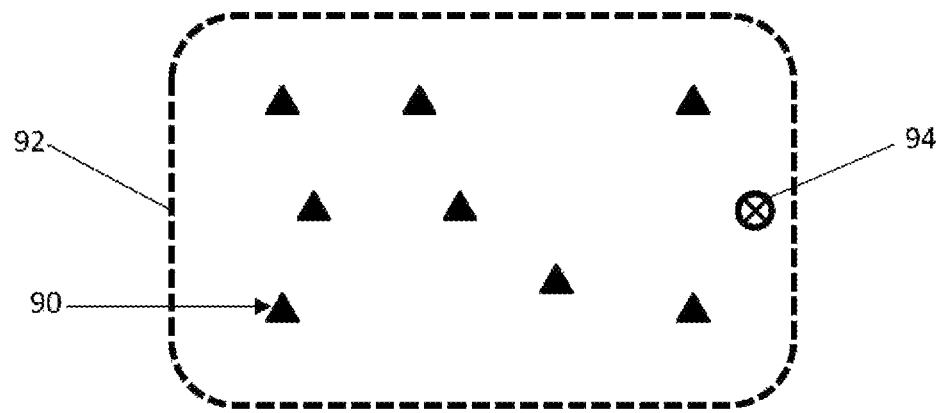

Figure 8

| | | |
|---|---|---|
| | 4:40 PM | |
| | $15 off: men's haircuts<br>*Tony's Hair* | 9am-5pm today<br>*Read more* |
| | 50% off: movie tickets<br>*Independent Movies* | Next 10 minutes<br>*Read more* |
| | 50% off: Sourdough bread<br>*Artisan Bakers* | 7am-4pm today<br>*Read more* |
| | Bonus: 2 for one, roast chickens<br>*Chuck's Chickens* | Next 20 minutes<br>*Read more* |
| | 25% off: Bali holiday packages<br>*Worldwide Holidays* | 9am-5pm today<br>*Read more* |
| | Bonus: Free hotel with flight<br>*Worldwide Holidays* | 9am-5pm today<br>*Read more* |
| | $30 off: Summer dresses<br>*Barbara's Fashion Boutique* | 10am-7pm today<br>*Read more* |
| | Bonus: Free dessert with meal<br>*Daily Cafe* | 10am-5pm today<br>*Read more* |

Figure 9

EVENT NOTIFICATION SYSTEMS AND METHODS

TECHNICAL FIELD

The disclosure herein generally relates to event notification, and specifically but not exclusively to event notification systems, methods for event notification, systems for communicating a plurality of items of event information, methods for communicating a plurality of items of event information, systems for generating information indicative of a location of a mobile wireless communication device, and methods of generating information indicative of a location of a mobile wireless communication device.

BACKGROUND

One of the advantages of shopping malls and shopping districts is that they bring together many types of shops and make it convenient for shoppers to purchase multiple types of products in the same trip. When a shopper sees a discounted item on sale, they may buy it immediately even though the item may not have been the reason for the visit. Buying the item at that time takes advantage of the discounted price on offer and saves the shopper from making a separate trip for the item. However, if the shopper does not notice the shop, or if the shopper does not notice that the item is discounted, they won't be able to take advantage of the discount. The likelihood of missing out on a discount increases as the size of a shopping precinct increases because the shopper is less likely to pass by the shop by coincidence.

Some of the tactics used by shop owners to overcome this problem include handing out flyers at busy areas, installing extra signage, and making public announcements. However, there can be so much marketing information on offer that shoppers don't absorb it.

Local community groups face a similar challenge when attempting to notify locals about an issue. For example, if a local group wishes to call a meeting to discuss a local issue, their options for notifying locals include letterbox drops, public signage, and door knocking. However, all of these methods are either labour intensive, ineffective, or slow.

SUMMARY

Disclosed herein is an event notification system. The system comprises a receiver arranged to receive event information comprising geographical region information indicative of a geographical region for each of a plurality of events and time interval information indicative of a time interval for each of the plurality of events, the receiver also being arranged to receive location information indicative of a location of a wireless communication device at a time. The system comprises a notifier arranged to use the event information and the location information when so received to determine a set comprising each of the plurality of events for which the geographical region encompasses the location of the mobile wireless communication device and the time interval encompasses the time, and arranged to send event notification information indicative of at least one event in the set to the mobile communications device for the mobile communications device to notify a user of the at least one event in the set.

Examples of events include:
"Commercial events", for example a sales offer from a particular shop vendor that only applies for a specific time interval;
"Emergency events", for example an emergency notification relevant to people in a particular geographical region for a specific time interval;
"Community events", for example a notification of a special event at a community town hall for a specific time interval; and
"Entertainment events", for example a notification for a specific time interval about a discount on tickets for a concert or movie scheduled at a particular time at a particular venue.

An embodiment comprises a requestor arranged to request the location information indicative of the location of the wireless communication device at a time.

In an embodiment, the receiver is arranged to receive a plurality of items of event information each being indicative of a respective one of the plurality of events, each item of event information comprising geographical region information indicative of a geographical region and time interval information indicative of a time interval, and wherein the notifier is arranged to use the plurality of items of event information and the location information when so received to determine a set comprising each of the plurality of events for which the geographical region encompasses the location of the mobile wireless communication device and the time interval encompasses the time.

In an embodiment at least one of the plurality of events is located within the indicated geographical region thereof.

The geographical region may be within a shopping centre. The geographical region may be at least a portion of the footprint of the shopping centre. Users inside the at least a portion of the footprint of the shopping centre may receive the event information when so sent. The event notification system may stimulate shopping centre visitors to attend the at least one event in the set.

In an embodiment, at least one of the plurality of events is located outside of the indicated geographical region thereof.

In an embodiment, at least one of the plurality of events is at least partially surrounded by the indicated geographical region thereof.

In an embodiment, at least one of the plurality of events is adjacent the indicated geographical region thereof.

The geographical region may be an annulus or topologically similar shape. For example, the event may be within a shopping centre and the geographical region may be an annulus encircling a footprint of the shopping centre. Alternatively, the event may be within a shopping centre and the geographical region may be a C-shaped region adjacent the shopping centre. Only users outside the shopping centre may receive the event information and the event information may be used to attract visitors into the shopping centre. In another example, the geographical region may extend over a portion of a road and the event may be located near the road. Users driving on the road may receive the event information. The event information may attract users to stop and attend the event. In another example, the geographical region may extend over a portion of a road and the event may be located in a town bypassed by the road. The road may be, for example, a highway or a freeway.

In an embodiment, each of the plurality of items of event information comprise delimiting time period information indicative of a time period delimiting the respective one of the plurality of events, wherein at least one of the following apply:

the time interval for the at least one of the plurality of events is at least one of partially overlapping and encompassing the time period delimiting the respective one of the plurality of events;

the time interval for an event starts before the time period delimiting the respective one of the plurality of events;

the time interval starts and finishes during the time period delimiting the respective one of the plurality of events;

the time interval is the time period delimiting the respective one of the plurality of events; and the time interval ends before the time period delimiting the respective one of the plurality of events starts.

For example, the event may be a movie scheduled to run from 2 pm to 4 pm (the delimiting time period) and the time interval may be from 9 am to 1:50 pm.

In an embodiment, the location information indicative of the location of the wireless communication device is generated using at least one of:

cell-tower triangulation;

satellite-based global positioning system (GPS) location tracking; and wireless local area network (WI-Fi) location tracking.

The mobile wireless communication device may be capable of being tracked in real time and wirelessly sending and receiving communications signals. Examples include suitably equipped mobile phones, smart phones, tablet computers and laptop computers.

In an embodiment the notifier is arranged to select from the set the at least one event indicated by the event notification information according to user notification preferences.

In an embodiment the user notification preferences are based on event characteristics.

In an embodiment, the event characteristics comprise at least one of event type, event provider, geographical region, and time interval.

The notifier may be arranged to store the user notification preferences

In an embodiment, the receiver has a network interface arranged to interface with a network for receiving the event information and for receiving the location information. The requestor may have the or another network interface arranged to interface with the or another network for sending a request for the location information.

An embodiment comprises an Application Program Interface (API) server having the receiver, and a push server having the notifier. The API server may have the requestor.

In an embodiment, each of the plurality of events comprise an advertisement for at least one of a product and a service.

In an embodiment, at least one of the event information and the location information is contained within at least one data communication protocol packet.

In an embodiment, the receiver is arranged to receive the location information indicative of a location of each of a plurality of mobile wireless communication devices, and the notifier is arranged to determine for each of the plurality of mobile wireless communication devices a respective event set comprising those of the plurality of events comprising a geographical region that encompasses the respective location and comprising a time interval encompassing the respective time and subsequently send the respective event set to each of the plurality of mobile wireless communication devices for notifying a respective user of the respective event set.

An embodiment comprises a requestor arranged to request the location information indicative of the location of each of the plurality of mobile wireless communication devices.

Disclosed herein is a method for event notification. The method comprises the step of receiving event information comprising geographical region information indicative of a geographical region for each of a plurality of events, and time interval information indicative of a time interval for each of the plurality of events. The method comprises the step of receiving location information indicative of a location of a wireless communication device at a time. The method comprises the step of determining, using the event information and the location information so received, a set comprising each of the plurality of events for which the geographical region encompasses the location of the mobile wireless communication device and the time interval encompasses the time and subsequently receiving the location information. The method comprises the step of sending event notification information indicative of at least one event in the set to the mobile communications device for the mobile communications device to notify a user of the at least one event in the set.

An embodiment comprises the step of sending a request for the location information indicative of the location of the wireless communication device at a time In an embodiment the step of receiving comprises the step of receiving a plurality of items of event information each being indicative of a respective one of the plurality of events, each item of event information comprising geographical region information indicative of a geographical region and time interval information indicative of a geographical region, and wherein the step of determining comprises using the plurality of items of event information and the location information when so received to determine a set comprising each of the plurality of events for which the geographical region encompasses the location of the mobile wireless communication device and the time interval encompasses the time.

In an embodiment, at least one of the plurality events is located within the indicated geographical region thereof.

In an embodiment, at least one of the plurality of events is located outside of the indicated geographical region thereof.

In an embodiment, at least one of the plurality of events is at least partially surrounded by the indicated geographical region thereof.

In an embodiment, at least one of the plurality of events is adjacent the indicated geographical region thereof.

In an embodiment each of the plurality of items of event information comprise delimiting time period information indicative of a time period delimiting the respective one of the plurality of events, wherein at least one of the following apply:

the time interval for the at least one of the plurality of events is at least one of partially overlapping and encompassing the time period delimiting the event;

the time interval for an event starts before the time period delimiting the event;

the time interval starts and finishes during the time period delimiting the event;

the time interval is the time period delimiting the event; and the time interval ends before the time period delimiting the event starts.

In an embodiment, the location information indicative of the location of the wireless communication device is generated using at least one of:
cell-tower triangulation;
satellite-based global positioning system (GPS) location tracking; and
wireless local area network (Wi-Fi) location tracking.

An embodiment comprises selecting from the set the at least one event indicated by the event notification information according to user notification preferences.

In an embodiment, the user notification preferences are based on event characteristics.

In an embodiment the event characteristics comprise at least one of event type, event provider, geographical region, and time interval.

In an embodiment, the event information and the location information are received via a network interface interfaced with a network, and the request is sent via at least one of the network interface and another network interface interfaced with at least one of the network and another network.

In an embodiment the event information and the location information are received by an Application Program Interface (API) server, and the event notification information is sent by a push server.

In an embodiment, each of the plurality of events comprise an advertisement for at least one of a product and a service.

In an embodiment, at least one of the event information, the location information and the notification information is contained within at least one data communication protocol packet.

An embodiment comprises the steps of:
receiving location information indicative of a location of each of a plurality of mobile wireless communication devices;
determine for each of the plurality of mobile wireless communication devices a respective event set comprising those of the plurality of events comprising a geographical region that encompasses the respective location and comprising a time interval encompassing the respective time; and
sending the respective event set to each of the plurality of mobile wireless communication devices for notifying a respective user of the respective event set.

An embodiment comprises the step of sending a request for location information indicative of a location of each of a plurality of mobile wireless communication devices;

Disclosed herein is a system for communicating a plurality of items of event information indicative of a respective plurality of events to a mobile wireless communication device. Each of the plurality of items of event information comprise geographical region information indicative of a geographical region. The system comprises a boundary generator arranged to use the geographical region information of each of the plurality of items of event information to generate boundary information indicative of a geographical boundary enclosing the geographical regions of selected ones of the plurality of events. The system comprises a receiver arranged to receive location information indicative of a location of the mobile wireless communication device. The system comprises a notifier arranged to use the boundary information and location information to confirm that the location of the mobile wireless communication device is within the geographical boundary and subsequently send notification information indicative of at least one of the selected ones of the plurality of events to the mobile wireless communications device for the mobile wireless communications device to notify a user of the at least one of the selected ones of the plurality of events.

An embodiment comprises a requestor arranged to request location information indicative of a location of the mobile wireless communication device.

An embodiment comprises a selector arranged to use information indicative of the relative disposition of the plurality events to select the selected ones of the plurality of events.

The selected ones of the plurality of events may be adjacent. The geographical region for each of the plurality of events may be associated with information indicative of a time interval. The time interval may be delimited by a starting time and an expiry time. The starting time may include a starting date. The expiry time may include an ending date. The geographical region of each of the plurality of events may be associated with an active status during the time interval. The boundary generator may be arranged to check a composition of the selected ones of the plurality of events and deselect from the selected ones of the plurality of events an event having a geographical region not associated with the active status. The boundary generator may be arranged to check a composition of the selected ones and add an event having a geographical region adjacent to the selected ones if associated with the active status.

The boundary generator may be arranged to adjust the geographical boundary to encompass each geographical region of the selected ones. The boundary generator may be arranged to adjust the boundary so that the boundary remains at a predetermined distance from at least one geographical region of the selected ones. The boundary adjustment may comprise at least one adjustment selected from a group comprising: a change of shape; a change of size; and a translation.

In an embodiment, the location information indicative of the location of the wireless communication device is generated using at least one of:
cell-tower triangulation;
satellite-based global positioning system (GPS) location tracking; and
wireless local area network (Wi-Fi) location tracking.

In an embodiment, the receiver has a network interface arranged to interface with a network for receiving the location information, and the notifier has the network interface or another network interface arranged to interface with the or another network for sending the notification information.

An embodiment comprises an Application Program Interface (API) server having the receiver, and a push server having the notifier. The API server may comprise the requestor.

In an embodiment, each of the plurality of events comprises an advertisement for at least one of a product and a service.

In an embodiment, at least one of the notification information and the location information is contained within at least one data communication protocol packet.

An embodiment comprises a controller arranged to control the requestor, the controller being arranged to use the boundary information indicative of the geographical boundary to confirm that the mobile wireless communications device is located within the geographical boundary, and subsequently to cause the requestor to request further information indicative of the location of the mobile wireless communications device, the further information having greater accuracy than the location information, wherein the notifier is arranged to use the further information to confirm that the location of the mobile wireless communication device is within the geographical boundary Disclosed herein is a method for communicating a plurality of items of event information indicative of a respective plurality of events to a mobile wireless communication device. Each of the plurality of items of event information comprising geographical region information indicative of a geographical region. The method comprises the step of using the geographical region information of each of the plurality of items of event information to generate boundary information indicative of a geographical boundary enclosing the geographical regions of selected ones of the plurality of events. The method comprises the step of receiving location information indicative of a location of the mobile wireless communication device. The method comprises the step of using the boundary information and location information so received to confirm that the location is within the geographical boundary and subsequently send notification information indicative of at least one of the selected ones of the plurality of events to the mobile wireless communications device to notify a user of the at least one of the selected ones of the plurality of events.

An embodiment comprises the step of requesting the location information indicative of a location of the mobile wireless communication device.

An embodiment comprises using information indicative of the relative disposition of the plurality events to select the selected ones of the plurality of events.

In an embodiment, the location information indicative of the location of the wireless communication device is generated using at least one of:
  cell-tower triangulation;
  satellite-based global positioning system (GPS) location tracking; and
  wireless local area network (Wi-Fi) location tracking.

In an embodiment, the location information is received from the mobile communications device via a network interface interfaced to a network, and notification information is sent via the or another network interface interfaced to the or another network.

In an embodiment, the event notification information is sent by a push server.

In an embodiment, each of the plurality of events comprises an advertisement for at least one of a product and a service.

In an embodiment at least one of the notification information and the location information is contained within at least one data communication protocol packet.

An embodiment comprises using the boundary information and location information to confirm that the location is within the geographical boundary and subsequently request further information indicative of a location of the mobile wireless communications device, the further information having greater accuracy than the location information, and using the boundary information and the further information so received to confirm that the location is within the geographical boundary and subsequently send notification information indicative of at least one of the selected ones of the plurality of events to the mobile wireless communications device to notify a user of the at least one of the selected ones of the plurality of events.

Disclosed herein is a system for generating information indicative of a location of a mobile wireless communication device. The system comprises a requestor arranged to request first information indicative of the location of the mobile wireless communication device, and second information indicative of the location of the mobile wireless communication device, the second information indicating the location of the mobile wireless communication device with better accuracy than the first information, and the request for the second information indicative of location causing the mobile wireless communication device to consume more power than the request for the first information indicative of location. The system comprises a receiver arranged to receive the first information and the second information. The system comprises a controller arranged to control the requestor. the controller being arranged to use the first information indicative of location and at least one predetermined rule to determine circumstances in which the controller causes the requestor to request the second information indicative of location.

In an embodiment the first information is generated using cell tower triangulation and the second information is generated using one of satellite-based global positioning system (GPS) location tracking and wireless local area network (Wi-Fi) location tracking.

The at least one predetermined rule may comprise a rule to request the second information indicative of location if the first information indicates that the mobile wireless communications device satisfies a predetermined location condition. In an embodiment, the predetermined location condition comprises a condition that the first information indicative of location indicates that the mobile wireless communications device is located in a predetermined geographical area. In an embodiment, the predetermined location condition comprises a condition that the first information indicative of location indicates that the mobile wireless communications device is at a location which has been visited at least once previously by a user of the mobile wireless communications device.

The at least one predetermined rule may comprise a rule to request the second information indicative of location if the mobile wireless communications device satisfies a predetermined time condition. In an embodiment, the predetermined time condition comprises a time at the mobile wireless communications device matching at least one predetermined time. For example, the at least one predetermined time may comprise a time each day at 12:00 pm at the mobile wireless communications device. In another example, the at least one predetermined time may comprise a time hourly intervals starting at 12:00 pm at the mobile wireless communications device. In an embodiment, the predetermined time condition comprises a predetermined time interval elapsing at the mobile wireless communications device since a previous request for the second information indicative of location. For example, the predetermined time condition may comprise one hour elapsing at the mobile wireless communications device since a previous request for the second information indicative of location.

The at least one predetermined rule may comprise a rule to request the second information indicative of location if the first information indicates the mobile wireless communications device is located with a predetermined spatial relationship to a predetermined geographical region.

The at least one predetermined rule may comprise a rule to request the second information indicative of location if the first information indicates the mobile wireless communications device is moving with a predetermined spatial relationship to a predetermined geographical region.

In an embodiment, the receiver has a network interface arranged to interface with a network for receiving the event information and for receiving the location information.

An embodiment comprises an Application Program Interface (API) server having the receiver and the requestor.

In an embodiment, each of the plurality of events comprise an advertisement for at least one of a product and a service.

In an embodiment, at least one of the first information and the second information is contained within at least one data communication protocol packet.

Disclosed herein is a method of generating information indicative of a location of a mobile wireless communication device. The method comprises requesting first information indicative of a location of the mobile wireless communication device, and second information indicative of a location of the mobile wireless communication device, the second information indicating the location of the mobile wireless communication device with better accuracy than the first information, and each request for the second information causing the mobile wireless communication device to consume more power than each request for the first information. The method comprises receiving the first information and the second information. The method comprises using at least one predetermined rule that uses the first information to determine circumstances in which to request the second information.

In an embodiment, the first information is generated using cell tower triangulation, and the second information is generated using one of satellite-based global positioning system (GPS) location tracking and wireless local area networking (WI-FI) location tracking.

In an embodiment, the first information and the second information are received via a network interface interfaced with at least one of a network and another network.

In an embodiment, the first information and second information are received by an Application Program Interface (API) server.

In an embodiment, at least one of the first information and the second information is received within at least one data communication protocol packet.

Disclosed herein is an event notification system. The system comprises a receiver arranged to receive a plurality of items of event information indicative of a respective plurality of events. Each of the plurality of items of event information comprises geographical region information indicative of a geographical region, time interval information indicative of a time interval, and eligibility information indicative of at least one eligibility criterion, and location information indicative of a location of a mobile wireless communication device at a time. The system comprises a notifier arranged to use the plurality of items of event information and the location information when so received to determine a set comprising each of the plurality of events for which the geographical region encompasses the location of the mobile wireless communication device, the time interval encompasses the time and the at least one eligibility criterion is satisfied, the notifier being further arranged to send information indicative of at least one event in the set to the mobile wireless communication device to notify a user of the at least one event in the set.

An embodiment comprises a requestor arranged to request the location information indicative of the location of a mobile wireless communication device at the time, the receiver being arranged to receive the location information.

The notifier may be arranged to store information about the user of the mobile wireless communications device for determining whether the user satisfies the at least one eligibility criterion.

Embodiments of the system may provide a way to exclusively notify particular users, namely those who satisfy the at least one eligibility criterion.

In an embodiment, the eligibility criterion comprises at least one of a user holds a valid membership of a customer benefits program and the user holds a valid membership to a group.

For example, the customer benefits program may comprise a customer loyalty program. The customer loyalty program may reward customers, with for example loyalty reward points, for patronage of a business or other organization including, but not limited to, a shop, an airline, a cinema, a restaurant, a government organization, and a community organization. In an embodiment, the at least one eligibility criterion comprises a requirement that the user has accumulated at least a predetermined number of loyalty reward points.

Another example of a customer benefits program is a Very Important Person (VIP) benefits program. Members of the program may be entitled to receive benefits not available to other customers, such as discounts or invitations to restricted-access events.

Another example of a customer benefits program is a staff benefits program. Members may qualify for the program if they are employees of a predetermined employer. The members may be entitled to benefits not available to other customers, such as discounts or invitations to restricted-access events.

Examples of a group include, but are not limited to, a club, a community organization, a professional association, a charity, a union, an educational institution, and an employer.

Each of the plurality of events in the set (the "event") may be exclusively for users who satisfy the at least one eligibility criterion. Access to the event may comprise a benefit for users who satisfy the at least one eligibility criterion. For example, the event may comprise an opportunity to purchase from a shop during a time interval when discounts are available. In another example, the event may comprise a form of entertainment.

The time interval may be delimited by a starting time and an expiry time. In an embodiment, the event is located within the geographical region. The geographical region may be within a shopping centre. The geographical region may be at least a portion of the footprint of the shopping centre. Eligible users inside the at least a portion of the footprint of the shopping centre may receive the event information when so sent. The event notification system may stimulate shopping centre visitors to attend the at least one event in the set.

In an embodiment, the event may be outside the geographical region. The event may take place at a location adjacent the geographical region. The geographical region may at least partially surround but not include a location at which the event takes place. The geographical region may be an annulus or topologically similar shape. For example, the event may be within a shopping centre and the geographical region may be an annulus encircling a footprint of the shopping centre. Alternatively, the event may be within a shopping centre and the geographical region may be a C-shaped region adjacent the shopping centre. Only users outside the shopping centre may receive the event information and the event information may be used to attract visitors into the shopping centre. In another example, the geographical region may extend over a portion of a road and the event may be located near the road. Users driving on the road may receive the event information. The event information may attract users to stop and attend the event. In another example, the geographical region may extend over a portion of a road and the event may be located in a town bypassed by the road. The road may be, for example, a highway or a freeway.

In an embodiment, the location information is generated using at least one of cell tower triangulation, satellite-based global positioning system (GPS) location tracking and wireless local area network (Wi-Fi) location tracking.

The mobile wireless communication device may be capable of being tracked in real time and wirelessly sending and receiving communications signals. Examples include suitably equipped mobile phones, smart phones, tablet computers and laptop computers.

In an embodiment, the receiver has a network interface arranged to interface with a network for receiving the event information and for receiving the location information. The requestor may have the network interface or another network interface arranged to interface with the network or another network for sending a request for the location information.

An embodiment comprises an Application Program Interface (API) server having the receiver and the requestor.

In an embodiment, each of the plurality of events comprises an advertisement for at least one of a product and a service.

In an embodiment, at least one of the plurality of items of event information and the location information is contained within at least one data communication protocol packet.

Disclosed herein is a notification method. The method comprises receiving a plurality of items of event information indicative of a respective plurality of events, each of the plurality of items of event information comprising geographical region information indicative of a geographical region, time interval information indicative of a time interval, and eligibility information indicative of at least one eligibility criterion, and information indicative of a location of the mobile wireless communication device at a time. The method comprises using the plurality of items of event information and location information to determine a set comprising each of the plurality of events for which the geographical region encompasses the location of the mobile wireless communication device, the time interval encompasses the time, and the at least one eligibility criterion is satisfied. The method comprises sending information indicative of at least one event in the set to the mobile wireless communications device to notify a user of the at least one event in the set.

An embodiment comprises requesting the location information indicative of a location of the mobile wireless communication device at the time.

In an embodiment the eligibility criterion comprises at least one of a user holds a valid membership of a customer benefits program and the user holds a valid membership to a group.

In an embodiment the location information is generated using at least one of cell tower triangulation, satellite-based global positioning system (GPS) location tracking and wireless local area network (Wi-Fi) location tracking.

In an embodiment the event information is received via a network interface and the location information is requested via the or another network interface.

In an embodiment an Application Program Interface (API) server receives the plurality of items of event information and the information indicative of the at least one event in the set is sent by push server.

In an embodiment, each of the plurality of events comprises an advertisement for at least one of a product and a service.

In an embodiment, at least one of the plurality of items of event information and the location information is contained within at least one data communication protocol packet.

Disclosed herein is processor-readable tangible media including program instructions which when executed by a processor causes the processor to perform a method disclosed above.

Disclosed herein is processor-readable tangible media including program instructions which when executed by a processor causes the processor to perform a method disclosed above.

Disclosed herein is a computer program for instructing a processor, which when executed by the processor causes the processor to perform a method disclosed above.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIG. 8 shows an example of another usage of the event notification system.

FIG. 9 shows an example of a display of a user mobile software app used with the event notification system.

DESCRIPTION OF EMBODIMENTS

Figure 1:
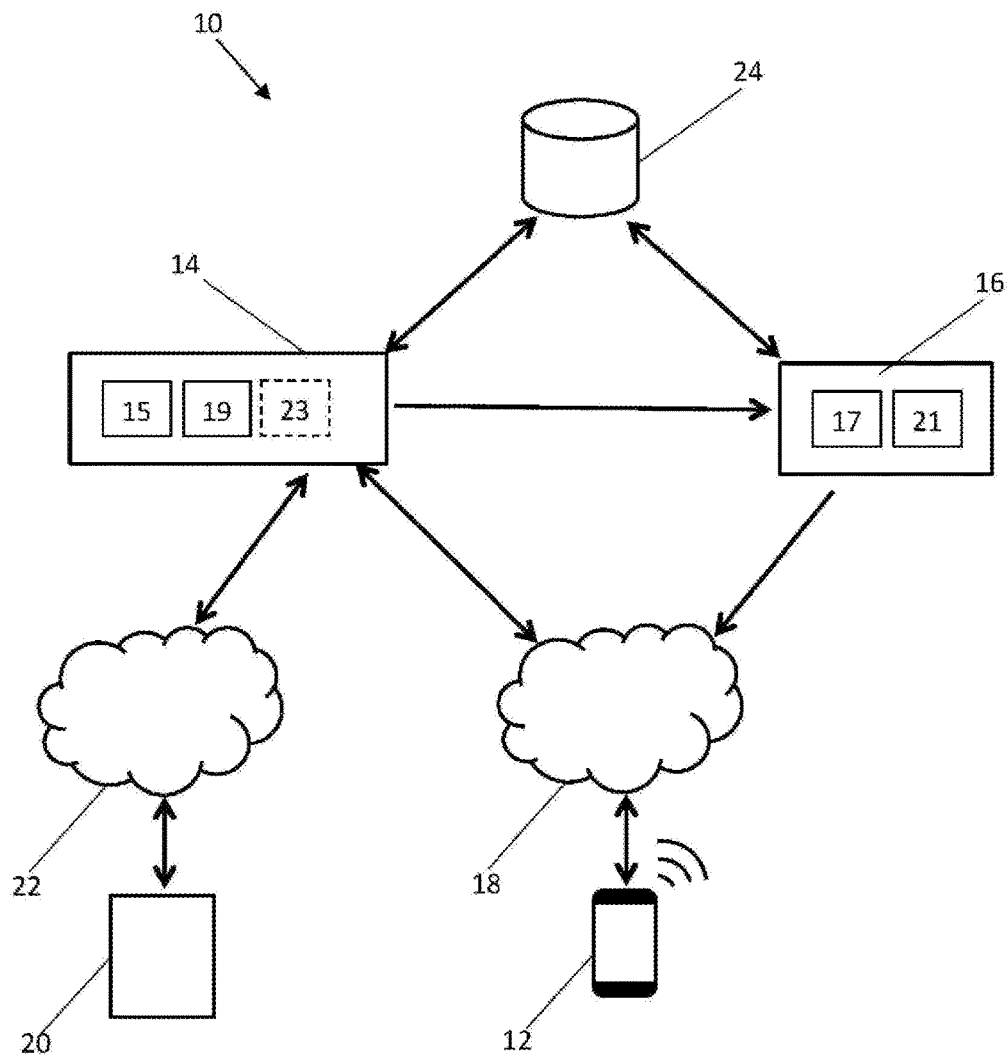
FIG. 1 is a block diagram of an example of an event notification system for a mobile wireless communication device.

FIG. 1 is a block diagram of an embodiment of an event notification system for a mobile wireless communication device, the system being generally indicated by the numeral 10. The mobile wireless communications device (the "mobile device") 12 communicates with a computer server in the form of an API server 14 and another computer server in the form of a push notification server 16 (the "push server 16"), via a network 18 in the form of a mobile phone telecommunications network (eg. cell and/or WiFi network) and/or computer network. Servers 14 and 16 may take any suitable form and are not limited to API and push servers. The mobile device 12 is capable of transmitting information indicative of its location, and the system 10 receives this information via the API server 14. For example, the information indicative of location may be sourced from one or more of cell-tower triangulation, satellite-based global positioning system (GPS) location tracking, and wireless local area network (Wi-Fi) location tracking. The system may operate with many users and mobile devices.

A user of the mobile device 12 receives event notifications about events generated by an event provider 20. The event provider 20 uploads information about an event to the API server 14 via a network 22 in the form of a telecommunications and/or computer network. The API server 14 performs the role of a receiver arranged to receive each item of event information from each event provider 20, and to receive information indicative of location from the mobile device 12. The API server 14 and the push server 16 both communicate with a database 24 in the form of a computer implemented database to record and retrieve data, including data about events, users, and location of each user's mobile device. A notifier process, which in this embodiment operates on the push server 16 in the form of a notifier module, determines which event notifications should be sent to the mobile device 12. Event notifications pass from the API server 14 to the push server 16, and the push server transmits the event notifications over the network 18 to the mobile device 12. Although the notifier process in this embodiment operates on the push server 16, it may alternatively operate on another computing device in communication with the push server. The networks 18 and 22 are generally, but not necessarily, the same network.

The mobile device 12 may be capable of being tracked in real time and wirelessly send and receive communications signals. Examples include suitably equipped mobile phones, smart phones, tablet computers and laptop computers.

In this embodiment, the location of the wireless communication device 12 may be sent thereby to the system 10 without prompting by the system 10. In other embodiments, however, the system may send a request for location information. In the other embodiments, the API 14 generally has a requestor 23 in the form of the requestor module to make the request for the location information. The request may be sent, for example, to the wireless communication device 12 or alternatively to a location server that cooperates with the wireless communication device 12 to generate the location information. The other embodiment may be generally the same as the embodiment of FIG. 1 but for the addition of the requestor 23.

The system 10 may send event notifications to the mobile device 12. Alternatively or additionally, the event notifications may be sent to at least one other computing device of the user, including wireless and non-wireless computing devices. For example, the mobile device 12 may provide the system 10 with information indicative of its location, and the notifier may be arranged to cause the push server 16 to send event notifications to at least one other of the user's computing devices, including, but not limited to, a mobile phone, a tablet device, a laptop computer, and a desktop computer. The system may include options for the user to control which device should receive event notifications.

The event notification may take a number of forms. Examples include, but are not limited to, email message, SMS message, updating a software application operating on the user's computer, updating a web page known to the user, triggering an audible alert, triggering a visual alert, and a combination of at least two of these.

The event notification may be sent to the user directly from the push server 16 of the system 10. Alternatively, the event notification may be sent to the user via a third party. In one embodiment, the push server 16 of the system 10 communicates with a third party service that performs the role of sending event notifications to the user. Examples of third party services that may be suitable include, but are not limited to, Twitter stream, Facebook Graph API, Google Cloud Messaging, and the Apple Push Notification Service.

Each event notification may be sent to the user with an option for the user to register for the event and thereby confirm that the user will attend. If the user registers for an event, the mobile device 12 transmits information indicative of the registration to the API server 14. The API server 14 may transmit information indicative of the registration, for example information to identify the user, to the corresponding event provider.

The system 10 may provide users with an option to turn off notifications. The system 10 may provide an option for users to specify which event notifications are to be received. The system 10 may provide an option for users to specify which event notifications are not to be received. In each of these cases, the API server 14 receives each user's preferences regarding receiving event notifications and the notifier determines which event notifications are to be sent via the push server 16. For example, the system may provide an option to specify preferences for receiving event notifications based on one or more characteristics of the event, including but not limited to: event type; event provider; geographical region; and time interval. If a user specifies which event notification preferences, the mobile device 12 transmits information indicative of the notification preferences to the API server 14 and the information is stored in the database 24 in a user profile for the user.

Figure 2:
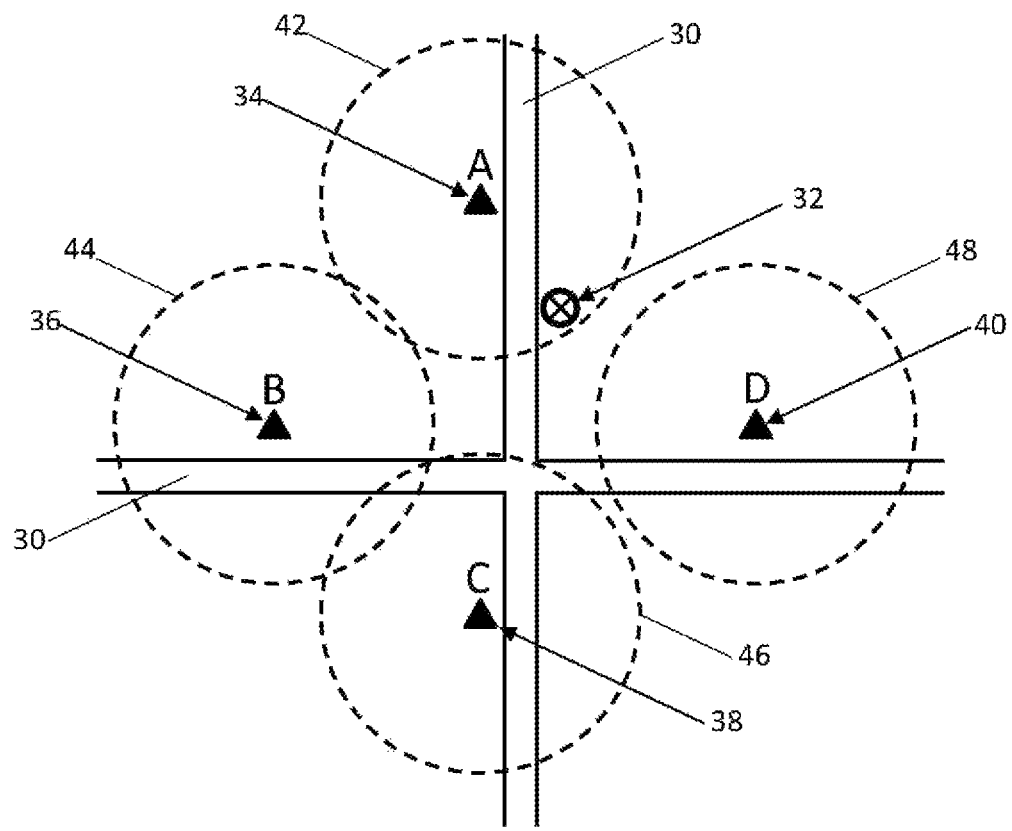
FIG. 2 shows an example of a usage of the event notification system.

FIG. 2 shows an example of how the system 10 may be used. FIG. 2 is a plan view of two intersecting streets 30 in a business district with shops (not shown) situated along the streets. Some of the shop vendors along the streets 30 are offering sales promotions for a limited time and wish to notify passing shoppers about their promotions. The system 10 processes each sales promotion as an event. Each event is associated with its own event information which includes a geographical region and a time interval specific to the event. The system 10 notifies a user of a mobile device 32 about an event if the mobile device 32 enters the associated geographical region of the event during the associated time interval for the event. The notifier operating on the push server 16 determines whether the mobile device 32 enters the associated geographical region of the event during the associated time interval for the event. In this example, there are four events 34, 36, 38, 40, each indicated by a black triangle, and the geographical region associated with each event is a circular region 42, 44, 46, 48 centred on the corresponding event. Table 1 lists the event providers, time intervals and the locations of the centres of the geographical region for the events shown in FIG. 2. Referring to event "A" indicated by triangle 34, the event is provided by "Tony's Hair". The associated time interval for the Tony's Hair event starts at 09:00 h on 11 Feb. 2015 and ends at 18:00 h on 11 Feb. 2015. A user of a mobile device 32 will be receive an event notification about the Tony's Hair event upon entering the geographical region 42 of the event during the associated time interval (09:00 h to 17:00 h on 11 Feb. 2015).

TABLE 1

| Event | Event Provider | Time interval | Location |
|---|---|---|---|
| A | Tony's Hair | 09:00 h to 17:00 h, 11 Feb. 2015 | 357 Smith St, Cityname |
| B | Independent Movies | 10:00 h to 18:00 h, 11 Feb. 2015 | 72 Jones St, Cityname |

TABLE 1-continued

| Event | Event Provider | Time interval | Location |
|---|---|---|---|
| C | Artisan Bakers | 16:00 h to 18:30 h, 11 Feb. 2015 | 397 Smith St, Cityname |
| D | Chuck's Chickens | 09:00 h to 17:00 h, 11 Feb. 2015 | 90 Jones, Cityname |

Figure 3:
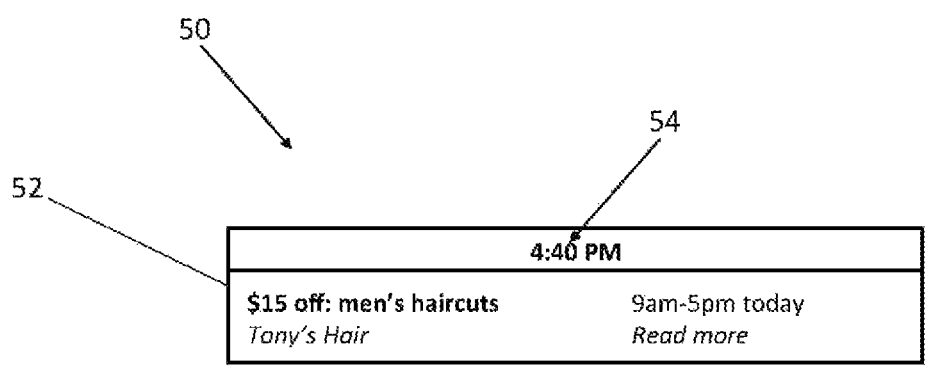
FIG. 3 shows an example of a display of a user mobile software app used with the event notification system.

FIG. 3 shows an example of an event notification 50 about the Tony's Hair event (shown as event A in FIG. 2), as sent by the system 10 to a user of the mobile device 32. In this example, the event is a $15 discount off men's haircuts. The user is notified about the Tony's Hair event via a mobile phone application for the system. The mobile phone application includes a separate panel 52 for each event. In this example, the panel 52 describes the event ($15 off: men's haircuts), the vendor name (Tony's Hair) and the time interval for the event (9 am-5 pm today). The local time 54 is shown at the top of the mobile phone application, and indicates that the user is within the time interval for this event. The notifer operating on the push server 16 determines that the user of the mobile device should not be notified about the other events B, C, D as the location of the user's mobile device 32 is outside the geographical regions 44, 46, 48 associated with those events. If the user were to enter one of the other geographical regions 44, 46, 48, the notifier would, upon receiving confirmation of the new location of the mobile device 32, control the push server 16 to send the user an event notification of the type shown in FIG. 3 about the associated event.

The panel 52 in FIG. 3 also includes a "Read more" link to further information about the event. Such further information may include, but is not limited to, event type, a detailed description of the event, background information about the event provider, user eligibility criteria for the event, rules, instructions for getting to the event, contact details for the event provider, website links, location of the event, artwork, photos, videos, other attractions associated with the event, and nearby attractions.

The geographical regions may be of any size or shape. Examples of possible shapes include, but are not limited to, rectangular, square, elliptical, and irregular shapes. The size and shape of a geographical region may be customised for each event. In an embodiment, the system 10 determines a default size and shape for the geographical region. For example, the default geographical region may be a circular region with a radius of 1 km which is centred on the associated event. Generally the radius may be any suitable length, for example 1 m, 10 m, 100 m, 1 km and 10 km. In an embodiment, the size and shape of the geographical region for an event may be varied by the event provider for the event.

Figure 4:
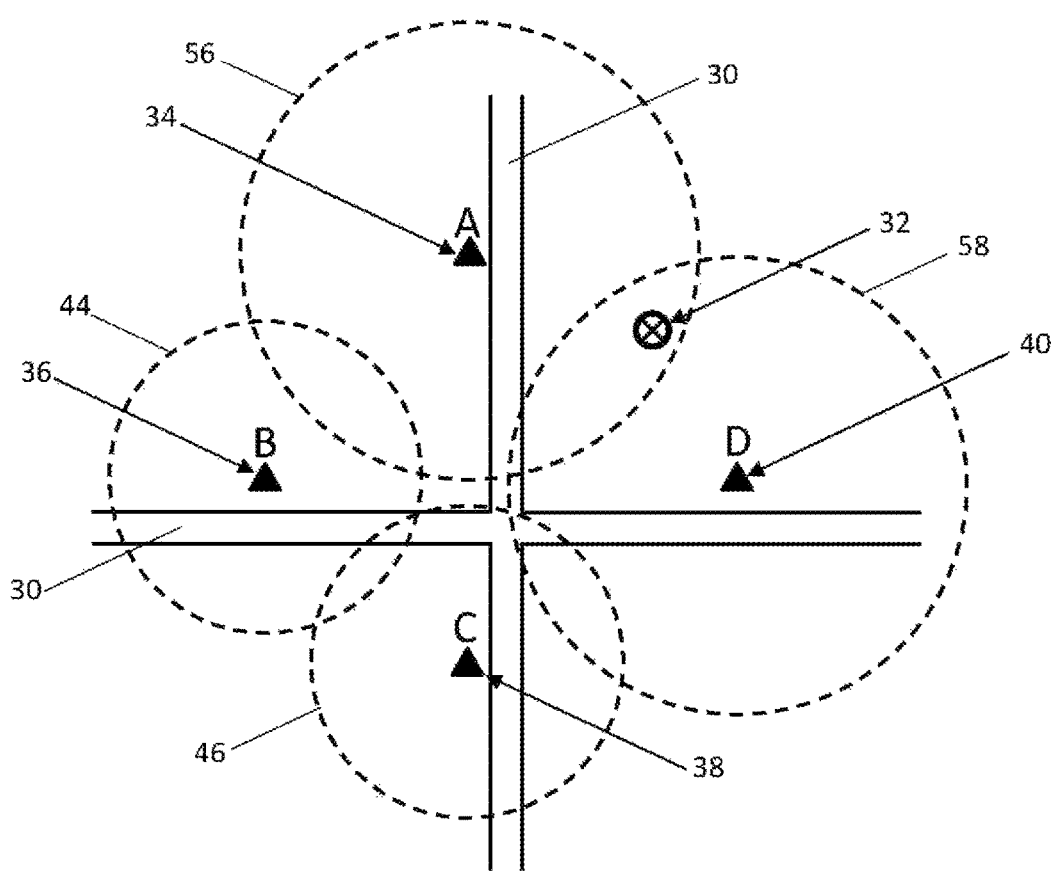
FIG. 4 shows an example of another usage of the event notification system.
Figure 5:
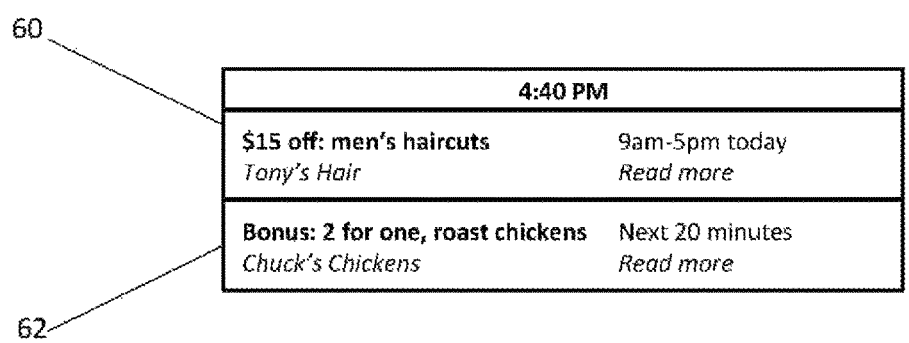
FIG. 5 shows an example of another display of a user mobile software app used with the event notification system.

Geographical regions may overlap. When a mobile device is located within overlapping geographical regions, the user is notified about events associated with both geographical regions, providing the user's mobile device is located in the geographical region during the time intervals for those events. FIG. 4 shows a variation on the example in FIG. 2 in which geographical regions 56, 58 are larger than geographical regions 44, 48. The user's mobile device 32 is at a location where two of the geographical regions 56, 58 overlap during the time intervals for both events, so the user is notified about events in both regions, namely event A for Tony's Hair and event D for Chuck's Chickens. FIG. 5 shows the mobile phone application displayed to the user when the mobile device 32 is at the location shown in FIG. 4 at 4:40 pm on 11 Feb. 2015. Two panels 60, 62 are displayed. The first panel 60 for Tony's Hair is the same as panel 52 shown in FIG. 3. The second panel 62 is for Chuck's Chickens regarding a special offer on roasted chickens (two for the price of one), and the event will only last for another 20 minutes until 5 pm (the time interval for the event is 9 am to 5 pm, as shown in Table 1).

In the embodiments shown in FIGS. 2 and 4, the location of each event is at the centre of the associated geographical region. Alternatively, the event may be located off-centre, at any point within the geographical region.

Figure 6:
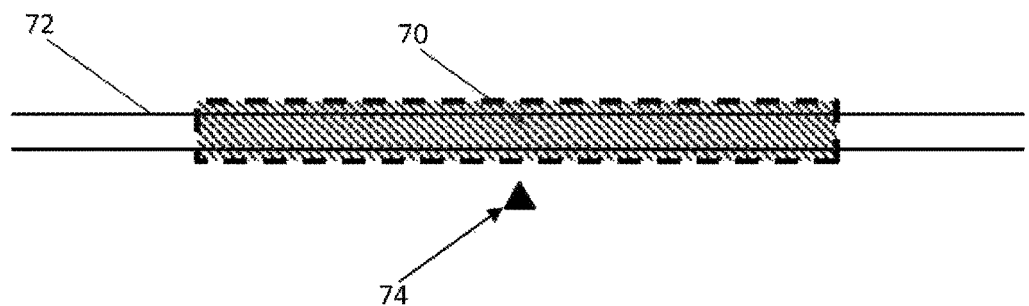
FIG. 6 shows an example of another usage of the event notification system.
Figure 7:
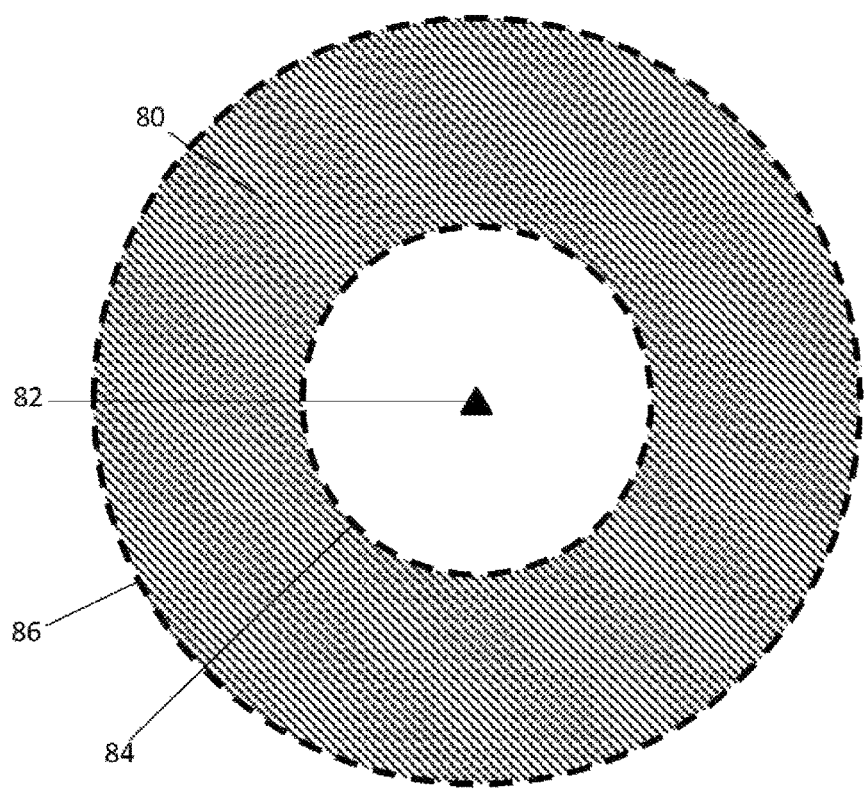
FIG. 7 shows an example of another usage of the event notification system.

Alternatively, as shown in FIGS. 6 and 7, the event may be located outside the associated geographical region. Referring to FIG. 6, an embodiment is shown in which the geographical region 70 (the shaded area inside dashed lines) covers an elongated strip which overlays a section of a road 72, and the event 74 is located adjacent the road 72. For example, the event may be a shop or service station. Users who are travelling along the road 72 will enter the geographical region 70 and receive an event notification for the roadside event 74. If the user is interested in the event, they have the opportunity to stop immediately and attend the event. Users who are not travelling on the road, such as those who are walking or living next to the road, will not receive event notifications for the event 74. This embodiment may enable the event provider to send event notifications which are specific to users who are travelling in a car, for example discounts on petrol or other car-related products.

FIG. 7 shows another embodiment in which the event is not within the geographical region.

The geographical region 80 is an annulus surrounding the event 82, and is the shaded area between the inner circular boundary 84 and outer circular boundary 86. For example, the region inside the inner boundary 84 may be a shopping mall, and the geographical region 80 may cover an area outside the shopping mall. This embodiment may enable the event provider to send event notifications which are specific to users outside the immediate vicinity of the event. The event provider may also create a separate event with a geographical region that covers the area inside the inner boundary 84, but offer different features compared to those offered to users located in the geographical region 80. In this way, an event provider may offer different events, such as different discounts, which depend on the location of the user. The geographical region may be any shape or size, and need not surround the event.

Registration and Sign-in of a User in one embodiment, a user may begin using the system 10 by first downloading a software application or "app" and registering with the system 10. The registration may be a native registration in which the user provides an email address, password, first and last name, or it may be via a social network the user is registered with, for example Facebook, Twitter and Google. If a social network is used to sign in, the system 10 may pass control to the social network to authenticate the user and allow various permissions for the software application. Upon registration, the API server 16 may create a user profile and store in the database 24 an external authentication token from the social network. The external authentication token may enable the system 10 to communicate event information to the social network.

Once registration or sign-in is successful, the API server 14 may also create an authentication token, referred to as an internal authentication token, to be passed back to each user's computing device communicating with the system 10. For example, the internal authentication token may be indicative of a user's account with the system 10 and may be used by any device receiving event notifications from the push server 16 or transmitting information indicative of location to the API server 14. The internal authentication token may be passed back to the API server 14 whenever the mobile device 12 sends information indicative of location to the API server 14, or when the user opens the app to perform an action. This may ensure that data is associated with the correct user. If the user signs in on multiple devices, each of the devices may share the same internal authentication token.

A single user account may be used with several of the user's mobile devices 12. The API server 14 may assign a unique device ID to each mobile device 12. The push server 16 may return the device ID to the mobile device 12 after the first time the mobile device 12 updates its location.

To facilitate push notification of events by the push server 16, the app may send the API server 14 a unique push notification token to identify this device. The push notification token may be generated and supplied by an external notification service. This token may be opaque and may be different for each push notification system.

A user of the mobile device 12 may download and install thereon an application in the form of, for example, an App from, for example, the Apple App or iTunes store, Google Play. The App may be started by a user of device 12 so that the user can interact remotely via the internet or other communication conduit with the system 10. When the App is running, the personal communication device is configured to take part in the execution of the example methods described herein.

The App may be built using IOS SDK, XCode, Android Studio, Android Software Development Kit "SDK" or APP INVENTOR, by Google Labs, for example, or generally any suitable environment and language.

In one embodiment, the user registration and sign-in steps are as follows.

1. User registers and signs in.
2. User's software application sends updates of the location of the mobile device 12 to the API server 14.
3. The push server 16 keeps track of the location of the user's mobile device 12.
4. The push server 16 sends an event notification to the user when the mobile device 12 is located within a geographical region of an event during the time interval for the event.
5. When the user opens the software application, it displays any live events in the geographical region in which the mobile device is located.

Registration and Sign-in of an Event Provider

In one embodiment, registration and sign-in of an event provider is similar to user registration and sign-in. The event provider may begin using the system 10 by first downloading an administration software application ("administration app") for event providers, and registering with the system 10. As with user registration, the registration of an event provider may be a native registration in which the event provider provides an email address, password, first and last name, or it may be via a social network the event provider is registered with, for example Facebook, Twitter and Google. If a social network is used to sign in, the system 10 may pass control to the social network to authenticate the event provider and allow various permissions for the software application. Upon registration, the API server 16 may create an event provider profile and store in the database 24 an external authentication token from the social network. The external authentication token may enable the system 10 to communicate event information to the social network.

Once registration or sign-in is successful, the API server 14 may also create an internal authentication token to be passed back to each event provider's computing device communicating with the system 10. This may ensure that data is associated with the correct event provider. If the event provider signs in on multiple devices, each of the devices may share the same internal authentication token.

In one embodiment, the event provider registration and sign-in steps are as follows.

1. The event provider registers and signs in.
2. The event provider purchases the right to promote events with the system e.g. a subscription or event credit pack.
3. The event provider registers an event (described in the following section) and enters event information, including the associated geographical region and time interval.
4. Optionally, the event may be checked by the system 10 before posting it. For example, the system 10 may check at least one of: the event has a physical street address; the event provider is entitled to hold the event at the street address; and that the event conforms with usage policies of the system.
5. The push server 16 notifies users who are currently within the geographical region of the event.
6. As other users move into the geographical region of the event, they are also notified of the event.

The purchase of a subscription or event-credit pack may be done by the software application downloaded at registration. Once the purchase is complete, the receipt may be sent to the API server 14 for validation and the appropriate credit is applied to the provider. In the case of a subscription, the API server may periodically check the status of the subscription and make any necessary adjustments to the event credit for the event provider.

Creating Events and Sending Event Notifications

In one embodiment, the system 10 provides event providers with an administration app to be used for creating and uploading event information to the API server 14. The administration app may provide a number of templates for entering event information. An advantage of providing a template is that it may help improve consistency in the way event information is presented from one event provider to another, which may in turn make it easier for users to find information and compare different events. For example, a template for an event that includes a discount may prompt the event provider to specify the discounted price as well as the normal price, to help users to compare events or determine whether an event is good value or not. Templates may also assist an event provider to include all the relevant information, including the location and time interval.

Events may be categorized into different event types and the administration app may provide a different template for each event type. Examples of event types include, but are not limited to:

Information events:
"Attend a book signing from 10 am today"
"Community meeting at the town hall 12 pm today"
"Bushfire emergency: evacuate your house within 1 hour."
Discount off specific items:
"$5 for coffee and cake, normal price $7.50, 9 am to 5 pm today"
"$70 running shoes, normal price $180, 9 am to 5 pm today"
Discount off a range of items:
"10% off all marked items in store all week"

"50% off all sporting goods, today only"
Multiplier discount:
"two for one, today only"
"buy two, get third free, all this week"
Customer loyalty points:
"Earn 100 bonus points with every movie ticket bought today"
"Earn 5000 frequent flyer miles when you book a flight with us today"

In one embodiment, an event provider may create an event using the following steps.

1. Event providers use the administration app to create and upload event information to the API server 14.
2. The API server 14 saves the event information in the database 24. The expiry time for the event may be stored and marked with an "active" status after the starting time for the event. A copy of the event information may also be stored in another database for historical purposes and associated with the profile of the event provider.
3. The API server 14 sends a message to the push server 16 to advise that a new event has been created.
4. The push server 16 calculates a geographical region for the event saves this with a record for the event.
5. The push server 16 looks for all registered mobile devices within the geographical region and sends them an event notification about the event. Users may be notified once for each event. The push server 16 keeps track of mobile devices that have been notified. The push server may batch multiple event notification into a single event notification if the mobile device is located within multiple geographical regions.
6. Once an event expires, the active status is cancelled and the event information is deleted from the database 24.

Tracking Location of a Mobile Device

The system 10 requires information indicative of the location of a user's mobile device in order to determine whether the mobile device is located within a geographical region of an event. In one embodiment, the system 10 uses an app on the mobile device 12 to gather information indicative of location. When the user app is started the first time, it may prompt the user for permission to use location services. If the user provides permission, the app will register for location updates using a low-power significant-location-change notification service provided by the underlying mobile operating system. Significant-location-change notification services may use cell tower triangulation to calculate an approximate location of the mobile device. In some embodiments, the accuracy may range from about 500 m to several kilometers, depending on the density of cell towers in vicinity of the mobile device.

In one embodiment, as new location updates are received from the operating system of the mobile device, they are processed as follows.

1. The app sends the location update to the API server 14, as well as the internal authentication token and device ID if available. The location update may contain the following information:
    a. Latitude
    b. Longitude
    c. Accuracy of the location update
    d. Time of the location update
    e. Speed of movement (if available)
    f. Course of movement (if available)
    g. Device ID (if available)
2. If a device ID is provided, the API server 14 server takes the information indicative of location and updates a corresponding device record with the info. The API server 14 also adds the information to a device location history record. If the device ID is not provided, a new device ID is created and associated with the user. The new device ID is returned to the app on the mobile device that sent the update so it can specify the device ID in future updates.
3. Based on the accuracy specified in the location update, a requestor 23 in the form of the requestor module of the API server 14 may request that the device obtain a more accurate location update. Further information is provided below under "Saving battery life".
4. The API server 14 sends the information indicative of location to the push server 16. The push server determines whether the information indicates that the mobile device is located within a geographical region of an event which currently has an active status. If so, the push server 16 sends an event notification to the user of the mobile device if one has not already been sent about that event.
5. If the API server 14 requests a mobile device for a more accurate location update, the mobile device may use GPS or Wi-Fi radio to obtain a more accurate location update. The process is then repeated from step 1 with the more accurate location update.

Grouping Adjacent Events

One of the challenges of implementing the invention on a large scale is to provide sufficient computer processing resources at the API server 14 and push server 16. The system 10 may need to process location updates from a large number of mobile devices, perhaps thousands or millions of devices, and provide up-to-date event notifications relevant to the current location of each user. If the computations cannot be performed quickly enough at the servers, users may receive event notifications that are too old and therefore not relevant to their current location. In at least some embodiments, the system 10 addresses this issue by grouping together adjacent events.

Referring to an embodiment shown in FIG. 8, eight events 90 are being held in the same local area. To reduce the number of server computations, the system 10 includes a boundary generator 15 which generates a theoretical geographical boundary 92 enclosing the events 90 and the geographical regions associated with these event. In this embodiment, the boundary generator 15 is a software process performed by the push server 16 in the form of a boundary generator module. When a mobile device 94 enters the geographical boundary 92, the system 10 sends event notifications for all active events inside the geographical boundary 92. In this example, eight events 90 currently have an active status, so the system sends the eight event notifications to the user. FIG. 9 shows an example of the eight notifications sent to users in respect of the eight events in FIG. 8. There are eight panels 96, each notifying the user of a different event The geographical boundary in FIG. 8 reduces the load on the push server 16 in two ways:

1. Instead of tracking the location of the mobile device 94 relative to eight separate geographical regions, the push server 16 only tracks the location of the mobile device relative to the single geographical boundary 92. Thus this location-tracking process may be reduced by approximately 1/n, where n is number of events within a geographical boundary.
2. Instead of sending eight separate event notifications to the user of mobile device 94, the push server 16 batches together the eight event notifications into a single transmission. Thus, the transmission overheads may be reduced by approximately 1/n.

In another embodiment, the system 10 includes a controller 19 which in this case is a software process operating on the API server 14 in the form of a controller module, however the controller may operate on another computing device in communication with the API server 14. When the API server 14 receives a location update indicating that a mobile device is within the geographical boundary, the controller 19 may control the API server 14 to request that the mobile device first obtains a more accurate location update before sending an event notification. If the more accurate location update confirms that the mobile device is within the geographical boundary, then the push server 16 will proceed to and send the batched event notifications for events enclosed by the geographical boundary. However, if the more accurate location update indicates that the mobile device is outside the geographical boundary, the controller prevents the push server 16 from sending event notifications for the enclosed events.

Figure 10:
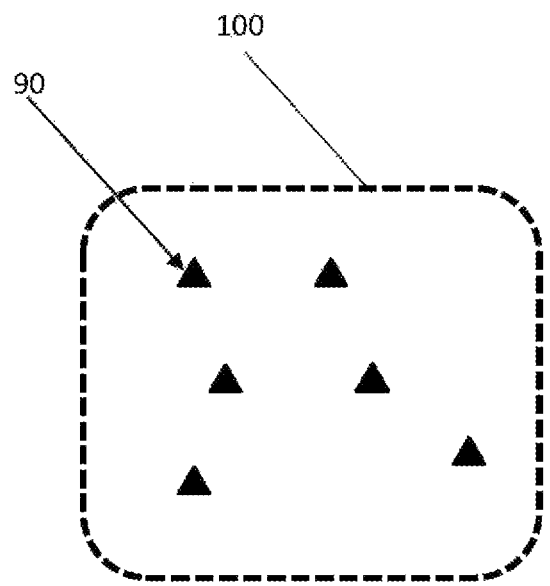
FIG. 10 shows an example of another usage of the event notification system.

In an embodiment, the size and shape of the geographical boundary 92 may be adjusted by the boundary generator 15 (in this but not necessarily in all embodiments operating on the push server 16) in response to events becoming active or expiring. FIG. 10 shows a geographical boundary 100 which is the same geographical boundary 92 from FIG. 8, but shown as it appears at a later time when two events (on the right) have expired. Only six events are now active and the push server 16 has contracted the geographical boundary 100 to enclose those six events.

Figure 11:
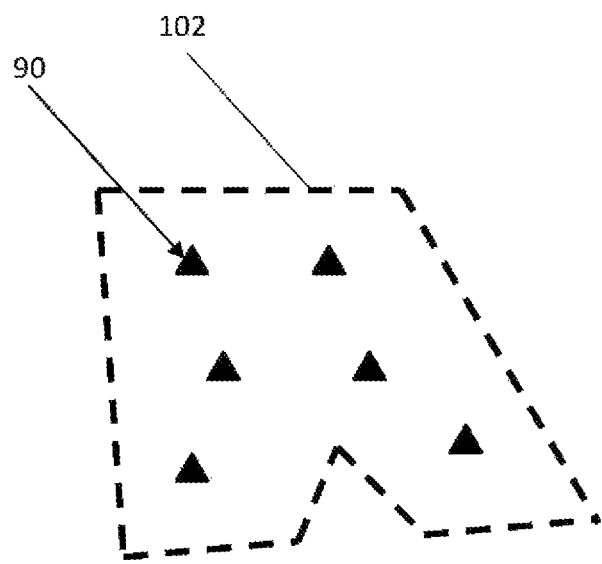
FIG. 11 shows an example of another usage of the event notification system.

In the examples shown in FIGS. 8 and 10, the boundary is generally rectangular, but it may be any shape, including but not limited to, circular, square, and irregular polygonal. To illustrate this, FIG. 11 shows an alternative geographical boundary for the same six events 90 shown in FIG. 10. The geographical boundary 102 is an irregular polygon instead of the rectangle with rounded corners shown in FIG. 10. In one embodiment, the boundary generator sets the geographical boundary at a minimum distance from the geographical regions of events, for example a polygon located 500 m outside the geographical region of each event.

In an embodiment, the size of the geographical boundary may be dependent on the mobility of users. For example, the geographical boundary may be smaller where users are on foot compared to areas where users are travelling in cars. In an embodiment, the size of the geographical boundary may be dependent on the distances between adjacent events. For example, the geographical boundary may be smaller for events that are located in an urban area compared to events located in country areas.

Figure 12:
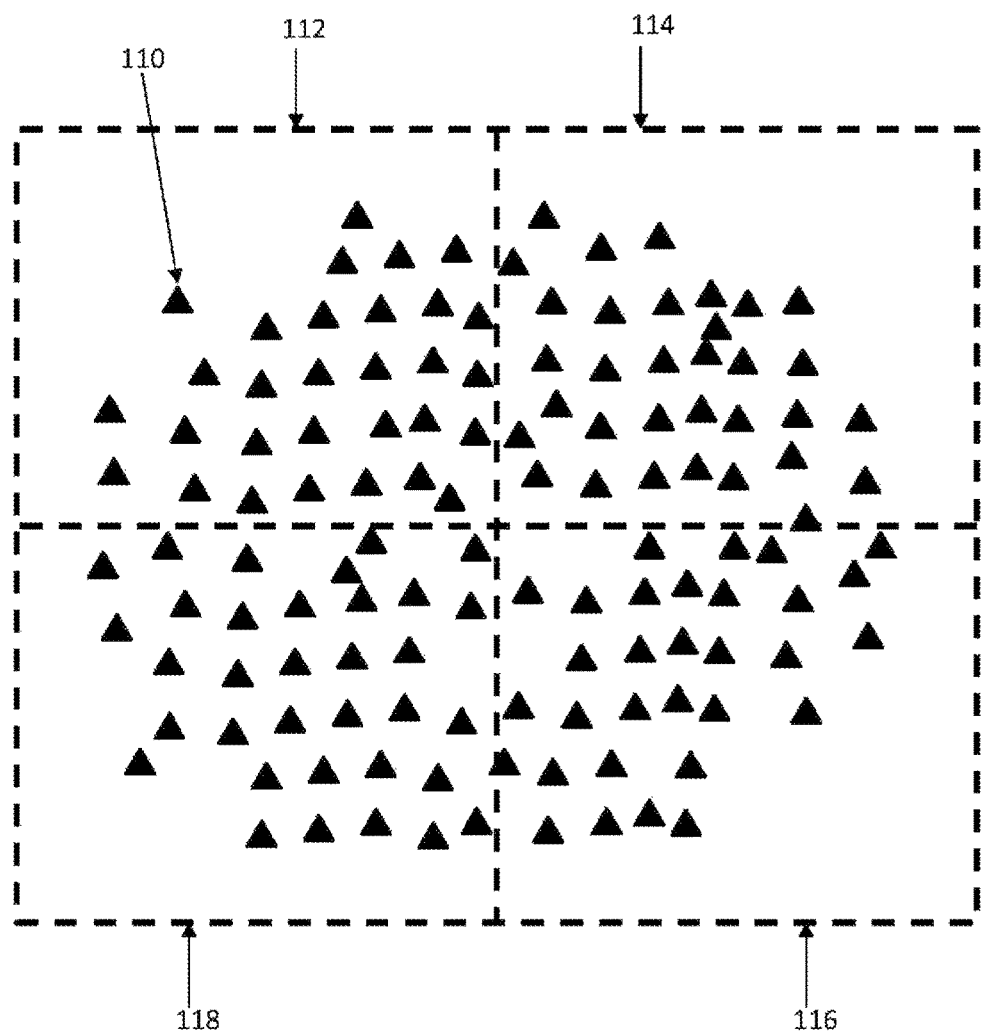
FIG. 12 shows an example of another usage of the event notification system.

In an embodiment, the geographical boundary may have at least one of a fixed size and a fixed shape. FIG. 12 shows an embodiment in which both the size and shape of the geographical boundary are fixed. In this embodiment, there are normally many events 110 which are active in the same locale. The boundary generator 15 operating on the push server 16 has created four geographical boundaries 112, 114, 116, 118 with a fixed size and shape to enclose the events 110. An advantage of this embodiment is that it avoids the need for the boundary generator to re-calculate the geographical boundary each time events become active or expire.

Conserving Battery Life

The system 10 needs to be able to track the location of mobile devices, but each location update performed by a mobile device consumes battery power. Users may be dissatisfied with the system 10 if it causes a battery of their mobile device to go flat after a few hours of usage. In at least some embodiments, the system reduces battery power consumption by tracking the location of mobile devices with a combination of a low-power-consumption method, for example cell-tower triangulation, and a higher-power-consumption method, for example satellite-based global positioning system (GPS) location tracking or wireless local area network (Wi-Fi) location tracking. GPS and Wi-Fi are usually capable of identifying the location of a mobile device with much better accuracy than cell-tower triangulation. However, the use of GPS and Wi-Fi on a mobile device consume more battery power than the use of cell-tower triangulation.

In an embodiment, a second controller 21 operating on the push server 16 requests a mobile device to use cell-tower triangulation to determine an approximate location of the mobile device and to transmit this information to the API server 14. When such information indicative of location is received by the API server 14, the second controller 21 refers to at least one predetermined rule which specifies circumstances in which to request a more accurate location update using, for example using GPS or Wi-Fi. If the second controller 21 determines, using the rules, that a more accurate location update is required, it requests the push server 16 to send a request to the mobile device for a more accurate location update based on GPS or Wi-Fi. The second controller 21 is in this embodiment is a software process operating on the push server 16 in the form of a second controller module, but it may alternatively operate on another computing device in communication with the push server 16.

Examples of circumstances in which a more accurate location update may be requested include, but are not limited to:

The mobile device is detected to be located within a geographical region associated with an active event.

The mobile device is detected to be located within a geographical boundary enclosing a plurality of active events.

The mobile device is detected to be within a predetermined distance of a geographical region associated with an active event. For example, the predetermined distance may be 500 m.

The mobile device is detected to be within a predetermined distance of a geographical boundary enclosing a plurality of active events. For example, the predetermined distance may be 500 m.

The mobile device is detected to be at a predetermined location.

The mobile device is detected to be in a predetermined geographical area.

The mobile device is detected to be at a predetermined location visited at least once previously by a user of the mobile device. For example, the predetermined location may be where the user lives or works.

The mobile device is detected to be in a predetermined geographical area visited at least once previously by a user of the mobile device.

The mobile device is detected to be moving and heading towards a geographical region associated with an active event.

The mobile device is detected to be moving and heading towards a geographical boundary enclosing a plurality of active events.

During particular time intervals.

The system 10 may record in the database a history of locations visited previously by users and use this information to identify patterns of behaviour. The patterns of behaviour may be used to determine when a higher accuracy location update is likely to be needed.

Additional Criteria for Notifying Users

In another embodiment of the system 10, the event information further includes information indicative of at least one eligibility criterion. The at least one eligibility criterion may, but not necessarily, apply to the users, for example. The provider of an event specifies the at least one eligibility criterion in addition to the geographical region and time interval for the event. If a user satisfies the at least one eligibility criterion for an event, and the mobile device 12 is located in the geographical region during the time interval for the event, the push server 16 will send the user an event notification for the event.

Figure 13:
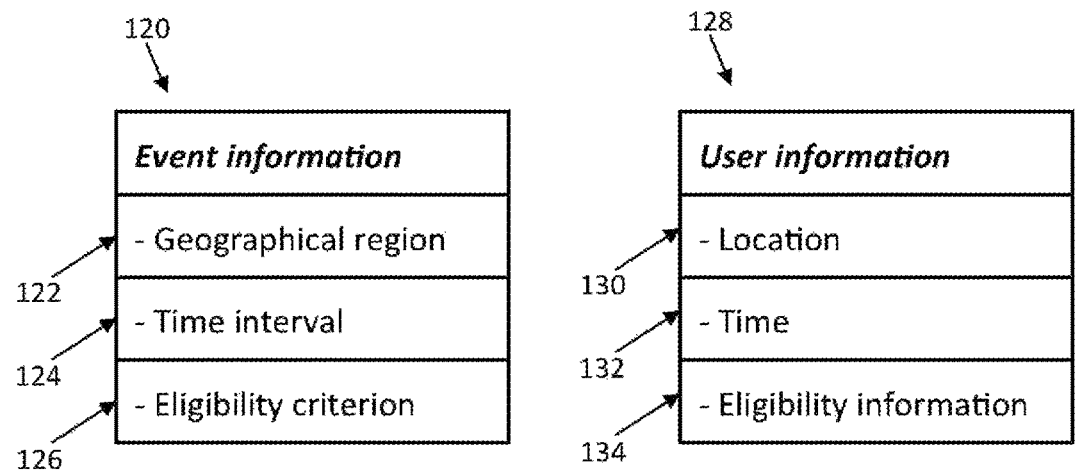
FIG. 13 shows an example of the data stored in another usage of the event notification system.

Referring to FIG. 13, there is shown an example of event information 120 stored in the database 24 for an event. The event information comprises geographical region information 122, time interval information 124, and at least one eligibility criterion 126. In one embodiment, the system 10 provides event providers with an administration app to be used for creating and uploading event information 120 to the API server 14. FIG. 13 also shows user information 128 for each mobile device 12. The user information comprises information indicative of location 130 measured at a time 132, and eligibility information 134 regarding the eligibility of the user of the mobile device to receive notifications for particular events or event types. For example, the eligibility information may comprise information that indicates that the user is a member of a particular customer benefits program.

The eligibility information 134 is stored with a profile for the user in the database 24. When the API server 14 receives information from a mobile device 12 to indicate that the mobile device is located within the geographical region 122 of an event during the time interval 124 of the event, the API server then checks the database 24 to determine whether at least one eligibility criterion 126 is stored for the event. If at least one eligibility criterion 126 is stored for the event, the API server 14 then checks the user's profile to determine whether the user's stored eligibility information 134 satisfies the eligibility criterion 126 for the event. If so, the API server 14 generates an event notification for the event, and the push server 16 transmits the event notification over the network 18 to a user of the mobile device 12. Otherwise, if the user's stored eligibility information 134 does not satisfy the eligibility criterion 126, the user will not receive a notification for the event.

In one embodiment, the at least one eligibility criterion comprises a requirement that the user holds valid membership of a customer benefits program. For example, the customer benefits program may be a customer loyalty program. The customer loyalty program may reward customers for patronage of a business or other organization including, but not limited to, a shop, an airline, a cinema, a restaurant, a government organization, and a community organization. The at least one eligibility criterion may further comprise a requirement that the user has accumulated a sufficient number of loyalty points.

In another example, the customer benefits program may be a very important person (VIP) program in which members of the program may be entitled to receive benefits not available to other customers. Examples of benefits for VIP members include discounts and invitations to special events. The special event may be an invitation-only event available only to VIP members, so the eligibility criterion provides a way to selectively send the notification only to users who are VIP members. Examples notifications for invitation-only events for VIP members include, but are not limited to:

"Preview movie screening for VIP members only";

"Exhibition open to VIP members only on Sunday"; and

"Exclusive 50%-off sale for VIP members after 6 pm today. Closed to the public."

In one embodiment, the at least one eligibility criterion comprises valid membership of a group. Examples of a group include, but are not limited to, a club, a community organization, a professional association, a charity, a union, an educational institution, and an employer.

Where an event notification is sent to a user whose eligibility information 134 meets the at least one eligibility criterion 126, the notification may be sent to the user with a request for the user to register for the event. If the user registers for an event, the mobile device 12 transmits information indicative of the registration to the API server 14. The API server 14 may transmit information indicative of the registration, for example information to identify the user or a loyalty card number, to the corresponding event provider. Based on the information indicative of the registration, the event provider may update loyalty points allocated to the user. For example, the system may be used as a way to earn loyalty points by attending an event.

In one embodiment, the registration is implemented on the mobile device with an "activate" button on a user app. When a user presses the "activate" button, the user confirms attendance at or participation in the event. In one embodiment, users update their eligibility information using the app. For example, membership of a customer loyalty program can be uploaded by selecting a loyalty card type then either scanning a loyalty card bar code or typing in its number into the user application.

Figure 14:
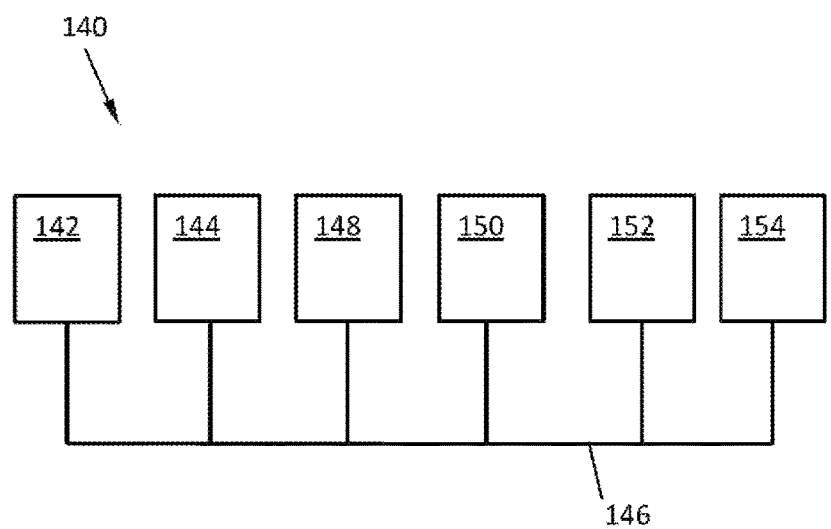
FIG. 14 shows a schematic diagram of an example architecture of a processor used the servers in FIG. 1.

FIG. 14 shows a schematic diagram of an embodiment 140 of the architecture of a processor. Each of the API server 14 and push server 16 may, for example, be a processor using the architecture shown in the embodiment 140. The software in this embodiment is stored in nonvolatile memory 142 in the form of FLASH, but could be stored in a hard drive, EPROM or any other form of tangible media within or external to the processor 140. The software generally, but not necessarily, comprises a plurality of software modules that cooperate when installed on the processor 140. Functions or components of the API server 14 and push server 16, for example, may be compartmentalized into software and/or hardware modules or may be fragmented across several software and/or hardware modules. The software modules may be formed using any suitable language, examples of which include C++, JAVA and assembly. The program may take the form of an application program interface or any other suitable software structure. The processor 140 includes a suitable microprocessor 144 (for example an Intel, ARM or AMD processor) connected by a bus 146 to random access memory 148 of non-volatile memory, for example a hard disk drive 150 or solid state non-volatile memory. The processor 140 has input/output interfaces 152 which may include one or more network interfaces in the form of, for example, a network interface card and a universal serial bus. The network interface card may be configured for Ethernet or some other data communication protocol. Generally but not necessarily, communications are sent and received as a payload of at least one data communication protocol packet, for example an Ethernet or INFINIBAND packet. Communication with the processor 140 may be made using, for example, a web browser interface via interfaces 152. An alternative example of a suitable processor may support a human machine interface 154 e.g. mouse, keyboard, display etc. The components 142 to 154 may communicate via the bus 146. The API server and push server may, in an alternative embodiment, each be software running on a processor such as that of FIG. 14.

Variations and/or modifications may be made to the embodiments described without departing from the spirit or ambit of the invention. For example, the system 10 may be a single hardware server having suitable software. The networks 18, 22 may in be a plurality of interconnected networks, for example the Internet. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. An event notification system comprising:
   a receiver arranged to receive a plurality of items of commercial event information uploaded by a plurality of vendors, each of the plurality of commercial events being for attendance by a plurality of shoppers with identities previously unknown to the plurality of vendors, each of the plurality of items of commercial event information being indicative of a respective one of a plurality of commercial events, each item of commercial event information comprising geographical region information indicative of a geographical region for the respective commercial event and time interval information indicative of a time interval for the respective commercial event, the receiver also being arranged to receive location information indicative of a location of each of a plurality of wireless communication devices of the plurality of previously unknown passing shoppers at a time;
   a boundary generator arranged to generate boundary information indicative of a boundary enclosing the geographical region of each of the plurality of commercial events for which the time interval thereof encompasses the time;
   a notifier arranged to use the boundary information and the location information when so received to determine whether the boundary encompasses the location of each of the plurality of mobile wireless communication devices of the plurality of previously unknown passing shoppers, and arranged to multicast event notification information indicative of the plurality of commercial events by sending to each of the plurality of mobile communications devices of the plurality of previously unknown passing shoppers event notification information indicative of each of the plurality of commercial events for the plurality of mobile communications devices to notify a plurality of users of the at least one event in the set.

2. An event notification system defined by claim 1 wherein each of the plurality of items of commercial event information comprise delimiting time period information indicative of a time period delimiting the respective one of the plurality of commercial events, wherein at least one of the following apply:
   the time interval for the at least one of the plurality of commercial events is at least one of partially overlapping and encompassing the time period delimiting the respective one of the plurality of commercial events;
   the time interval for an event starts before the time period delimiting the respective one of the plurality of commercial events;
   the time interval starts and finishes during the time period delimiting the respective one of the plurality of commercial events;
   the time interval is the time period delimiting the respective one of the plurality of commercial events; and
   the time interval ends before the time period delimiting the respective one of the plurality of commercial events starts.

3. An event notification system defined claim 1 wherein the location information indicative of the location of the wireless communication device is generated using at least one of:
   cell-tower triangulation;
   satellite-based global positioning system (GPS) location tracking; and
   wireless local area network (Wi-Fi) location tracking.

4. An event notification system defined by claim 1 wherein the notifier is arranged to select from the set the at least one commercial event indicated by the event notification information according to shopper notification preferences.

5. An event notification system defined by claim 1 wherein the receiver has a network interface arranged to interface with a network for receiving the commercial event information and for receiving the location information.

6. An event notification system defined by claim 1 comprising an Application Program Interface (API) server having the receiver, and a push server having the notifier.

7. An event notification system defined by claim 1 comprising a requester arranged to request the location information indicative of the location of each of the plurality of wireless communication devices at the time.

8. An event notification system defined by claim 1, comprising:
   a requestor arranged to request first information indicative of the location of a mobile wireless communication device of the plurality of mobile wireless communication devices, and second information indicative of the location of the mobile wireless communication device, the second information indicating the location of the mobile wireless communication device with better accuracy than the first information, and the request for the second information indicative of location causing the mobile wireless communication device to consume more power than the request for the first information indicative of location, wherein the location information comprises one of the first information and the second information; and
   a controller arranged to control the requestor, the controller being arranged to use the first information indicative of location and at least one predetermined power conserving rule to determine circumstances in which the controller causes the requestor to request the second information indicative of location.

9. The event notification system of claim 8, wherein the multicast event notification information comprises an option for a user to register for the respective event and confirm attendance of the event by the user.

\* \* \* \* \*